US011592676B2

(12) United States Patent
Danziger

(10) Patent No.: US 11,592,676 B2
(45) Date of Patent: Feb. 28, 2023

(54) NEAR-EYE DISPLAY WITH ENHANCED LASER EFFICIENCY AND EYE SAFETY

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/783,752

(22) PCT Filed: Mar. 22, 2021

(86) PCT No.: PCT/IL2021/050319
§ 371 (c)(1),
(2) Date: Jun. 9, 2022

(87) PCT Pub. No.: WO2021/214745
PCT Pub. Date: Oct. 28, 2021

(65) Prior Publication Data
US 2023/0019255 A1    Jan. 19, 2023

Related U.S. Application Data

(60) Provisional application No. 63/015,726, filed on Apr. 27, 2020, provisional application No. 63/012,283, filed on Apr. 20, 2020.

(51) Int. Cl.
*G02B 27/00* (2006.01)
*G02B 27/01* (2006.01)

(52) U.S. Cl.
CPC ..... *G02B 27/0172* (2013.01); *G02B 27/0093* (2013.01)

(58) Field of Classification Search
CPC .......... G02B 27/0093; G02B 27/0172
See application file for complete search history.

(56) References Cited

U.S. PATENT DOCUMENTS 5,096,520 A   5/1992  Faris
5,608,742 A   3/1997  Petersen
(Continued)

FOREIGN PATENT DOCUMENTS

JP   2015099323   5/2015
JP   2016033867   3/2016
(Continued)

OTHER PUBLICATIONS

Mukawa et al; "A full-color eyewear display using planar waveguides with reflection volume holograms" Journal of the SID 17/3,200.
(Continued)

*Primary Examiner* — Ryan A Lubit
(74) *Attorney, Agent, or Firm* — Mark M. Friedman

(57) ABSTRACT

A near-eye display for displaying an image to a viewer has enhanced laser efficiency and enhanced eye-safety features. The display includes a laser source which generates one or more laser spots and a scan driver which scans the laser spots across an image field. The electrical energy consumption is minimized by modulating the laser source at 3 power levels—a near-zero level, a near-threshold level, and a lasing level—and by synchronizing the modulation with the scan driver. In another embodiment, the laser module generates two or more laser spots which scan non-overlapping lines on the image field. The scanning is configured to prevent the light intensity at the eye of a viewer from exceeding eye-safety levels, even in the event of a scanning malfunction.

4 Claims, 7 Drawing Sheets

(56) References Cited

U.S. PATENT DOCUMENTS

| | | | |
|---|---|---|---|
| 5,852,693 A | 12/1998 | Jeong | |
| 5,905,837 A | 5/1999 | wang et al. | |
| 6,222,677 B1 | 4/2001 | Budd et al. | |
| 6,362,919 B1 | 3/2002 | Falnders | |
| 6,404,542 B1 | 6/2002 | Ziari et al. | |
| 7,206,479 B2 | 4/2007 | Wu et al. | |
| 8,488,245 B1 | 7/2013 | Chann et al. | |
| 8,665,178 B1 | 3/2014 | Wang | |
| 8,724,222 B2 | 5/2014 | Chann et al. | |
| 10,177,872 B1 | 1/2019 | Wang et al. | |
| 10,444,481 B2 | 10/2019 | Takahashi | |
| 11,092,810 B2 | 8/2021 | Danziger et al. | |
| 11,340,458 B2 | 5/2022 | Amitai et al. | |
| 2002/0017615 A1 | 11/2002 | Matsushita et al. | |
| 2002/0176153 A1 | 11/2002 | Matsushita et al. | |
| 2002/0186179 A1 | 12/2002 | Knowels | |
| 2003/0004336 A1 | 1/2003 | Siviero et al. | |
| 2003/0043364 A1 | 3/2003 | Jamieson | |
| 2003/0053507 A1 | 3/2003 | Islam et al. | |
| 2003/0165017 A1 | 9/2003 | Amitai | |
| 2004/0016525 A1 | 8/2004 | Tokura et al. | |
| 2004/0165254 A1 | 8/2004 | Tokuratoshiyuki | |
| 2005/0180687 A1 | 8/2005 | Amitai | |
| 2007/0035707 A1 | 2/2007 | Margulis | |
| 2007/0116079 A1 | 5/2007 | Giniunas et al. | |
| 2008/0019010 A1 | 1/2008 | Govorkov et al. | |
| 2008/0106493 A1* | 5/2008 | Lach | H04N 9/3129 345/46 |
| 2008/0204842 A1 | 8/2008 | Arai et al. | |
| 2008/0259429 A1 | 10/2008 | Kamm | |
| 2009/0168134 A1 | 7/2009 | Nojima | |
| 2009/0201996 A1 | 9/2009 | Uberna et al. | |
| 2010/0002029 A1 | 1/2010 | Takatsuka | |
| 2010/0020291 A1* | 1/2010 | Kasazumi | G03B 21/14 353/38 |
| 2010/0033508 A1 | 2/2010 | Mizushima et al. | |
| 2012/0033907 A1 | 2/2012 | Lell et al. | |
| 2012/0038892 A1* | 2/2012 | Kurtz | H04N 9/3105 353/121 |
| 2012/0039072 A1 | 2/2012 | Lell et al. | |
| 2012/0068609 A1 | 3/2012 | Ide et al. | |
| 2013/0010265 A1 | 1/2013 | Curtis | |
| 2013/0021581 A1 | 1/2013 | Takahashi et al. | |
| 2013/0335708 A1 | 12/2013 | Guderkirk | |
| 2014/0004961 A1 | 1/2014 | Brunet De Courssou et al. | |
| 2014/0049610 A1 | 2/2014 | Hudman et al. | |
| 2014/0327835 A1* | 11/2014 | Woltman | H04N 9/3135 348/759 |
| 2015/0288937 A1 | 10/2015 | Tsai et al. | |
| 2016/0327906 A1 | 11/2016 | Futterer | |
| 2017/0045664 A1 | 2/2017 | Chung et al. | |
| 2017/0125976 A1 | 5/2017 | Sato | |
| 2017/0242249 A1 | 8/2017 | wall et al. | |
| 2017/0299860 A1* | 10/2017 | Wall | G02B 3/04 |
| 2018/0009733 A1 | 4/2018 | Breidenassel et al. | |
| 2018/0097335 A1 | 4/2018 | Breidenassel et al. | |
| 2018/0262725 A1 | 9/2018 | Fan | |
| 2018/0264593 A1 | 9/2018 | Dubost et al. | |
| 2018/0267295 A1 | 9/2018 | Dalrymple | |
| 2018/0275396 A1 | 9/2018 | Schowengerdt et al. | |
| 2019/0005660 A1 | 1/2019 | Kinoshita et al. | |
| 2019/0018245 A1 | 1/2019 | Cheng et al. | |
| 2019/0033432 A1 | 1/2019 | Na et al. | |
| 2019/0121137 A1* | 4/2019 | Dykaar | H01S 5/02325 |
| 2019/0129175 A1 | 5/2019 | Amitai et al. | |
| 2019/0157839 A1* | 5/2019 | Gudaitis | H04N 9/3144 |
| 2019/0162950 A1* | 5/2019 | Lapstun | H04N 13/243 |
| 2019/0334321 A1 | 10/2019 | Aruga | |
| 2020/0183159 A1 | 6/2020 | Danziger | |
| 2020/0292818 A1 | 9/2020 | Amitai et al. | |
| 2020/0403705 A1* | 12/2020 | Fathololoumi | H04B 10/508 |
| 2021/0072553 A1 | 3/2021 | Danziger | |
| 2021/0103039 A1 | 4/2021 | Pei et al. | |
| 2021/0109353 A1* | 4/2021 | Nicholson | G02B 27/0081 |
| 2021/0135423 A1 | 5/2021 | Macomber | |
| 2021/0149204 A1 | 5/2021 | Amitai et al. | |
| 2022/0146906 A1 | 5/2022 | Vidne et al. | |

FOREIGN PATENT DOCUMENTS

| | | |
|---|---|---|
| WO | 2015188058 | 12/2015 |
| WO | 2019/149352 | 8/2019 |
| WO | 2019149352 | 8/2019 |
| WO | 2019154465 | 8/2019 |
| WO | 2021/044409 | 3/2021 |
| WO | 2021/053661 | 3/2021 |
| WO | 2021048864 | 3/2021 |
| WO | 2021063994 | 4/2021 |
| WO | 2021079371 | 4/2021 |
| WO | 2021124315 | 6/2021 |
| WO | 2021137208 | 7/2021 |

OTHER PUBLICATIONS

Lynch et al "beam Manipulation—Prisms VS Mirrors", Phononk International p. 45-47 Mar. 2009, https://www.edmundoptics.com/globalassets/knowledge-center/articles/beam-manipulation-prisms-vs-mirrors-en.pdf.

* cited by examiner

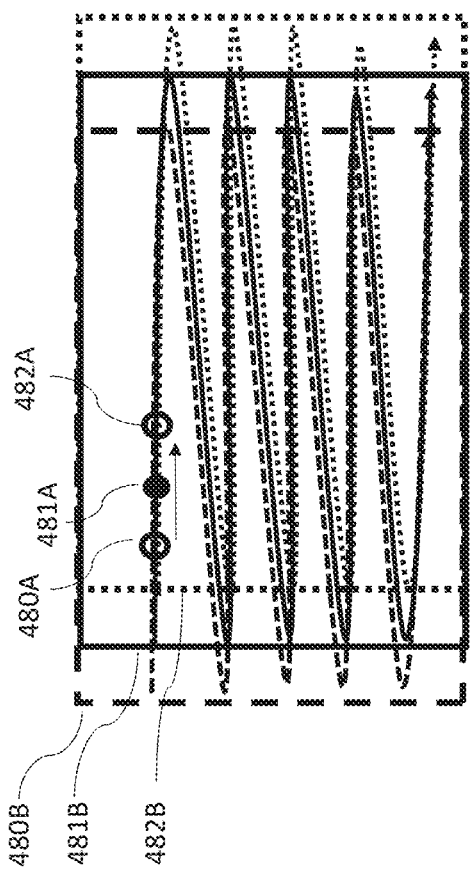
FIG. 4A
FIG. 4B
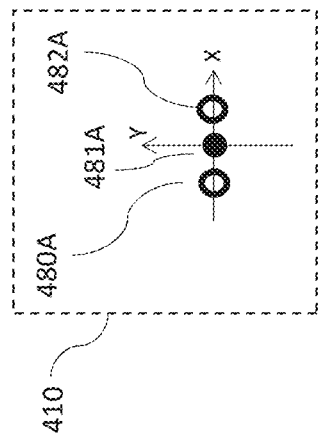
FIG. 4C
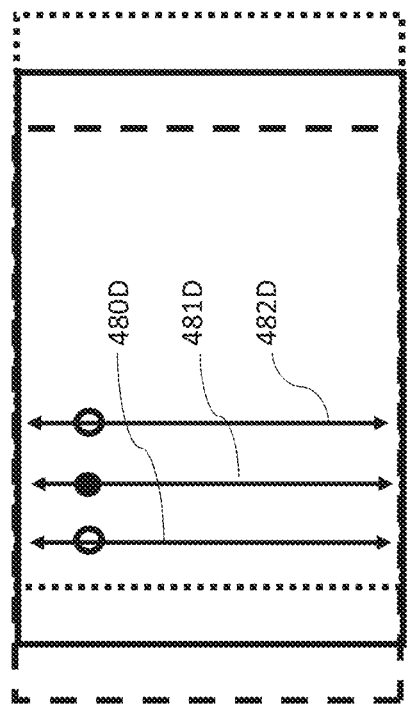
FIG. 4D

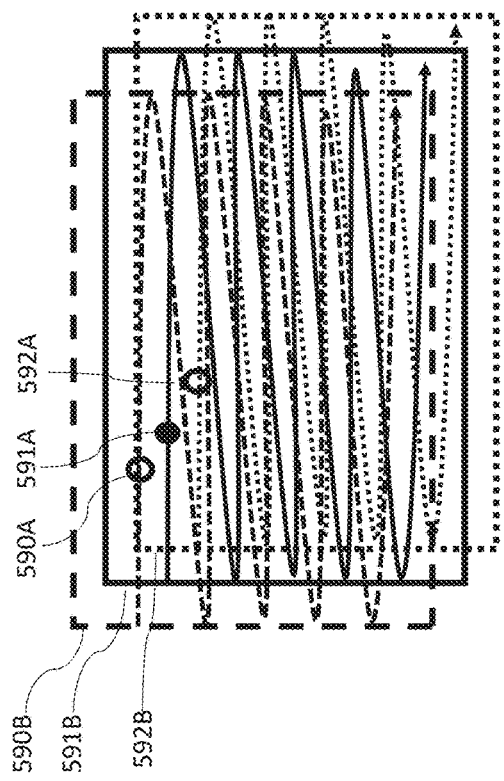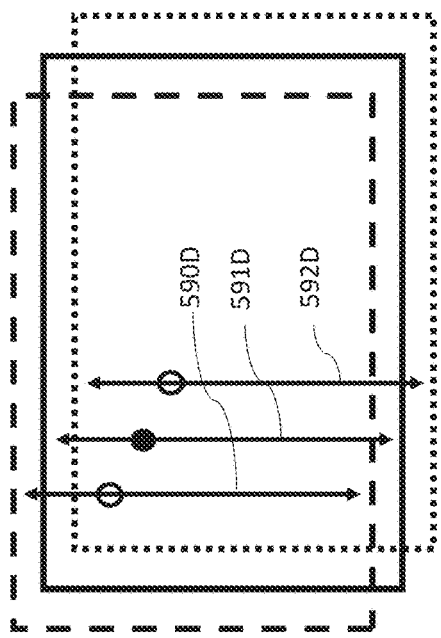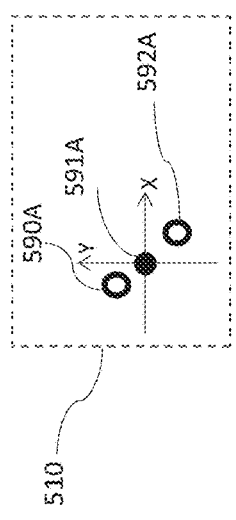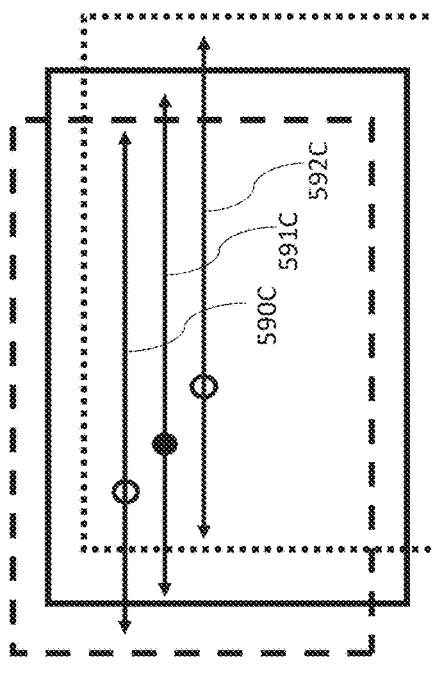

NEAR-EYE DISPLAY WITH ENHANCED LASER EFFICIENCY AND EYE SAFETY

CROSS-REFERENCE TO RELATED APPLICATIONS

This application is related to and claims priority from the following commonly owned U.S. Provisional Patent Applications, all of which are by the same inventor as this application: U.S. 63/012,283, filed on Apr. 20, 2020 and entitled "Near-eye Display with Reduced Eye Intensity"; and U.S. 63/015,726, filed on Apr. 27, 2020, and entitled "Laser Driver Modulation for a Laser Projector. The disclosures of the above provisional applications are incorporated by reference in their entirety herein.

FIELD OF THE INVENTION

The present invention relates to near-eye displays and, in particular, to a near-eye display with enhanced laser efficiency and eye safety.

BACKGROUND OF THE INVENTION

Laser illumination is often used in near-eye displays in order to provide a virtual image whose brightness is comparable to that of outdoor scenery. In color displays, the image is formed by a bright spot which is generated by red, green, and blue lasers. The spot is scanned over a field of view (FOV) by one or two mirrors, which are controlled by actuators.

In the design of such near-eye displays, there are two conflicting brightness requirements. On the one hand, the brightness of the scanned spot must be high enough for the image to be visible on a background of world scenery. On the other hand, the brightness must be low enough that the combined optical intensity entering the eye of an observer is within eye safety limits. This is especially true for blue light wavelengths, at which the human eye is particularly sensitive.

A further consideration for battery-powered near-eye displays is to reduce the electrical power needed to provide sufficient laser illumination. A laser light pulse is emitted when a laser resonant cavity is excited, or pumped, by a laser driver to a lasing threshold level which exceeds internal power losses in the cavity. The time duration of a laser light pulse is typically much shorter than the total time needed by the driver to excite the pulse. This limits the pulse repetition rate, in units of pulses per second, that can be achieved.

One way to achieve a high pulse repetition rate is to maintain the resonant cavity in a continually excited state, which is just below the lasing threshold. However, this requires continuous operation of the laser driver and the expenditure of large amounts of electrical energy.

SUMMARY OF THE INVENTION

The invention provides a near-eye display which provides a bright virtual image, while ensuring eye safety and conserving electrical energy.

According to one aspect of the presently disclosed subject matter, there is provided a near-eye display for displaying an image to a viewer. The display includes a laser driver controlling a laser module which generates at least three laser spots; and a scan driver in communication with a scan module which moves the laser spots within an image field. The laser driver provides a power modulation characterized by a baseline power level, a near-threshold power level, and a lasing power level. A timing of the power modulation is synchronized with the scan driver and is determined by a convolution of an image pattern with one or more uncertainty ellipses characterizing a position uncertainty of the laser spots.

According to some aspects, the timing of the power modulation is configured to minimize an electrical energy consumption of the near-eye display.

According to some aspects, the display includes a controller having an image generator and at least two illumination controllers.

According to some aspects, the at least two illumination controllers are configured to synchronize the timing of the power modulation with the scan driver and the image generator.

According to another aspect of the presently disclosed subject matter, there is provided a near-eye display for displaying an image to a viewer. The display includes a laser module generating at least three non-overlapping laser spots, each of which generates an apparent optical intensity impinging on an eye of the viewer; and a scan driver in communication with a scan module which moves the laser spots within an image field in at least two independent scan directions. Furthermore, the laser spots traverse non-overlapping lines during normal functioning of the scan module and/or during a malfunction of the scan module in which the laser spots fail to move in any one, or all, of the scan directions.

According to some aspects, at least two of the laser spots have different optical wavelengths.

According to some aspects, the laser spots are arranged in one or more lines which are substantially parallel to or at an oblique angle to one of the scan directions.

According to some aspects, no combination of the apparent optical intensities of the laser spots exceeds a predetermined eye-safety level during normal functioning of the scan module and/or during a malfunction of the scan module in which the laser spots fail to move in any one, or all, of the scan directions.

According to some aspects, the scan module includes a resonant scanner and a linear scanner.

According to some aspects, the display includes a sensor which measures a position of the resonant scanner.

According to some aspects, the scan module includes a two-axis mirror and a two-axis actuator.

BRIEF DESCRIPTION OF THE DRAWINGS

The invention is herein described, by way of example only, with reference to the accompanying drawings:

FIGS. 4A, 4B, 4C, and 4D: Drawings illustrating a first three-spot scanning method according to an embodiment of the invention.

FIGS. 5A, 5B, 5C, and 5D: Drawings illustrating a second three-spot scanning method, according to an embodiment of the invention.

DESCRIPTION OF THE INVENTION

The present invention includes a number of distinct aspects, each of which addresses issues relating to implementation of a near-eye display using laser illumination, and which can be used to advantage individually or combined in synergy to provide significant advantages. The principles and operation of near-eye laser displays according to the present invention may be better understood with reference to the drawings and the accompanying description.

Figure 1:
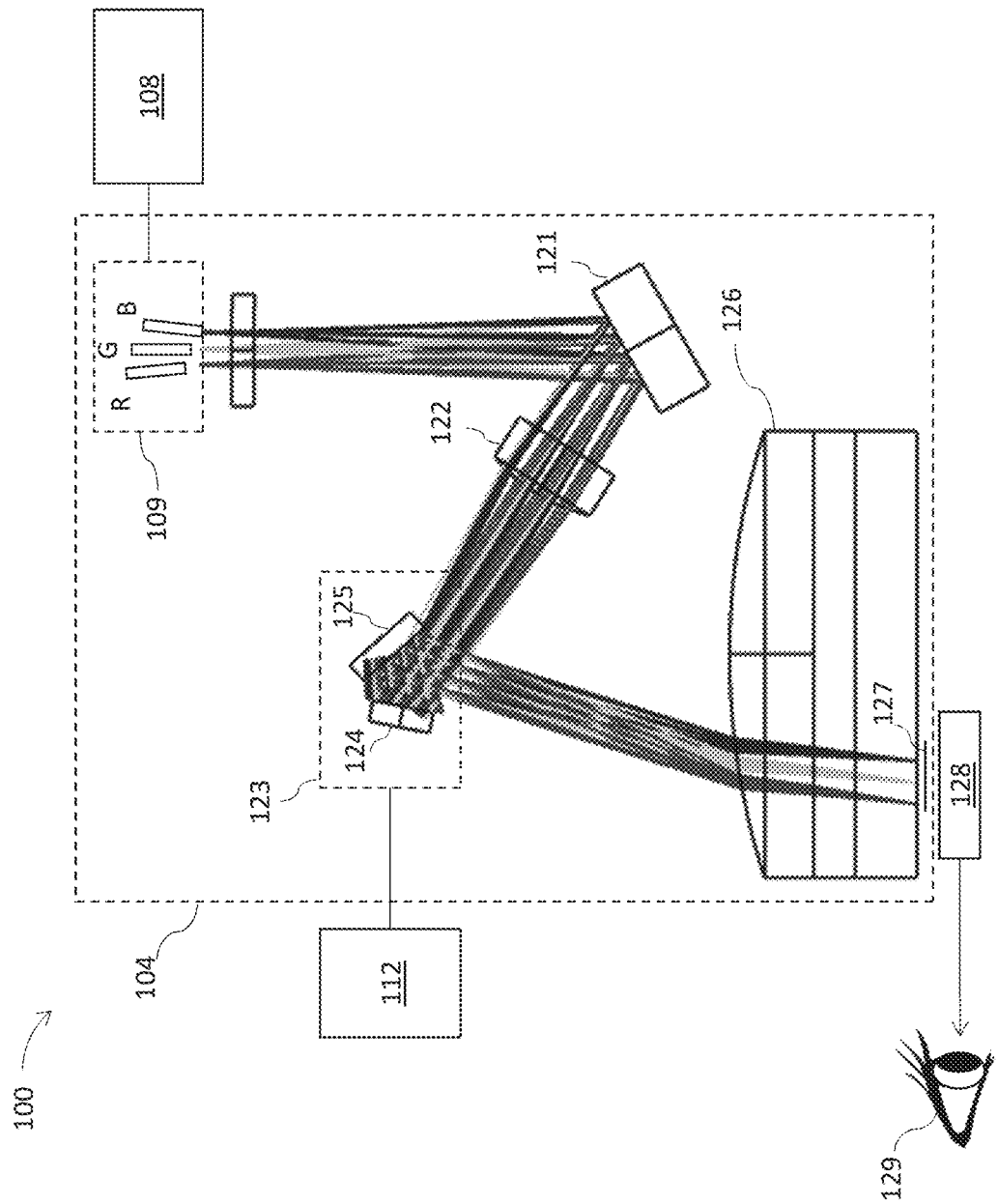
FIG. 1: An exemplary optical layout of a near-eye display, according to an embodiment of the invention.

FIG. 1 shows an exemplary optical layout of a near-eye display 100 according to the present invention. Illumination optics module 104 includes laser module 109 having three lasers sources, labeled red (R), green (G), and blue (B), whose intensities are controlled by the laser driver 108. The laser sources generate three divergent laser beams which propagate along different paths and are combined geometrically, as they are reflected by a mirror 121 and refracted by a lens 122. The combined beams are scanned in two orthogonal directions by a scan module 123, which is controlled in real-time by scan driver 112. The scan module 123 may consist of a resonant scanner 124 and a linear scanner 125, as shown in FIG. 1, or alternatively of a two-axis mirror and a two-axis actuator. Resonant scanner 124 generally includes a position sensor which enables a precise measurement of the laser spot position during scanning Imaging lens 126 provides pupil imaging, in order to couple the scanned beams into a waveguide pupil 127. The laser driver 108 and the scan driver 112 are synchronized by a controller (shown in FIG. 7) in order to generate an image which is projected by the projection optics module 128 to a viewer's eye 129.

Laser Power Modulations for Enhanced Laser Efficiency

Figure 2A:
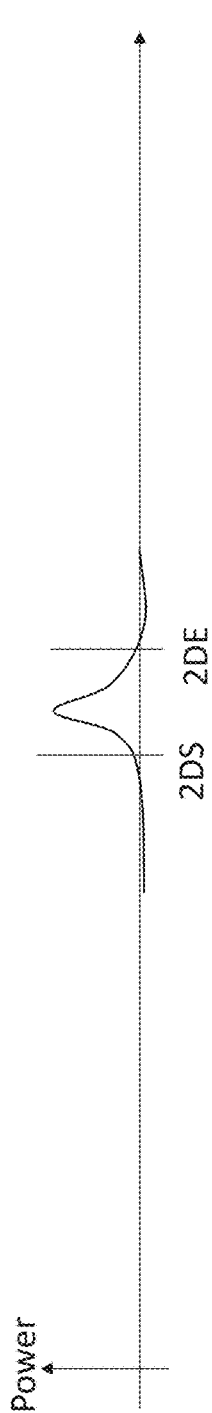
FIGS. 2A, 2B, and 2C: Graphs illustrating an exemplary laser power modulation, according to an embodiment of the invention.
Figure 2B:
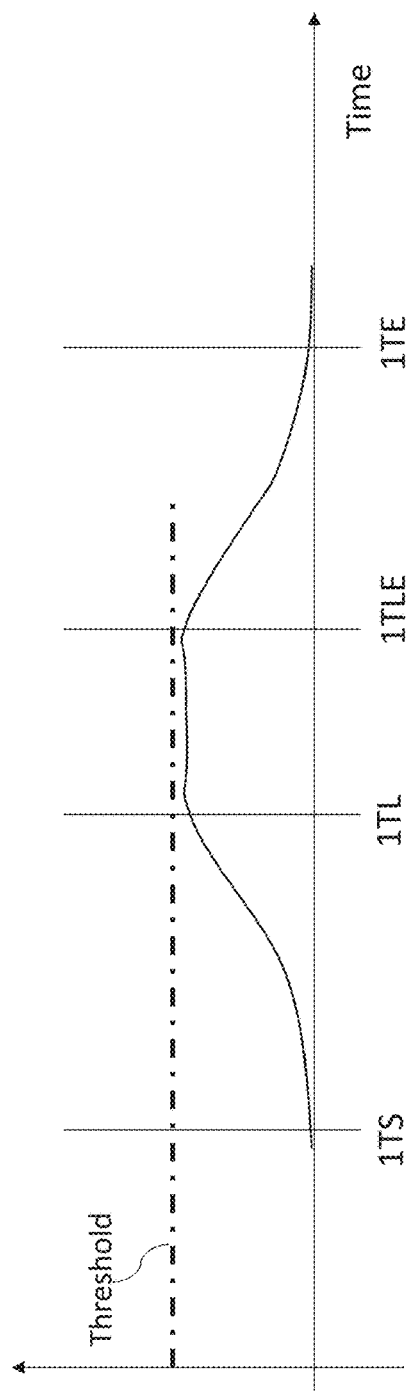
Figure 2C:
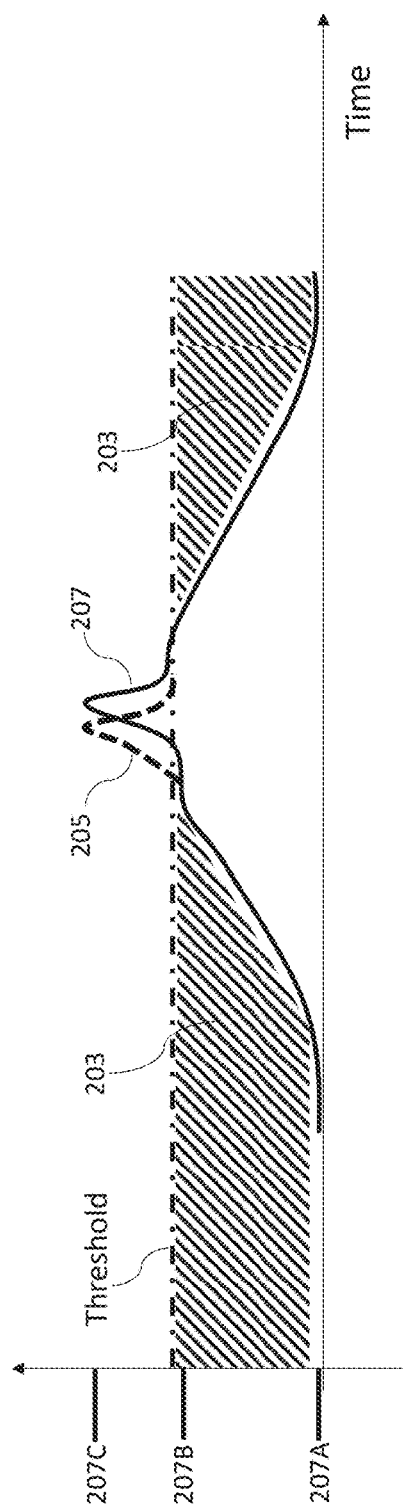

FIGS. 2A, 2B, and 2C show graphs illustrating an exemplary laser power modulation, according to the present invention. FIG. 2A shows a graph of the laser power, on the vertical axis, vs. time, on the horizontal axis, assuming for the moment an "ideal" situation in which (a) the threshold current to produce lasing is zero, and (b) the timing accuracy of the laser driver is perfect, that is, the laser pulse is triggered precisely at the time it is needed to generate a visible image pattern inside a laser display image field. In this ideal situation, the laser driver would only need to operate from time 2DS to time 2DE.

FIG. 2B shows a graph of an exemplary laser power modulation for maintaining the laser power at or just below a non-zero lasing threshold level, including time margins that take into account timing inaccuracy. The laser power for maintaining threshold starts at time 1TS ("threshold start") and stabilizes at time 1TL. The time 1TLE corresponds to the end of pumping for threshold. Without pumping, the laser power would decay and reaches its starting level, at a time 1TE. For simplicity, the rise time, (1TL-1TS), is shown as being roughly equal to the decay time, (1TE-1TLE). The magnitude of the threshold time interval (1TLE-1TL) depends upon the accuracy of estimation of the predicted position of the laser spot, at the time of calculating the laser power modulation parameters by the laser driver 108. (A prediction is needed because the precise position measurement of the laser spot provided by the position sensor mounted on the resonant scanner 124 is generally available only towards the end of the laser driver modulation calculation.) Furthermore, adjacent laser pulses generate a constant continuous threshold drive, which only decays when there is a substantial time interval between pulses.

FIG. 2C shows a graph of an exemplary laser power modulation for producing a laser pulse, according to the principles of the invention. The optimal power modulation 207 is represented by the solid curve, which is essentially a superposition of the graphs in FIGS. 2A and 2B. The plateau in 2B may shift with respect to the peak in 2A, as indicated by the dashed profile 205, without effecting the optimal power modulation 207. Modulation 207 is characterized by three laser power levels: a baseline power level 207A, a near-threshold power level 207B, and a lasing power level 207C. The near-threshold level power level 207B is just slightly below the threshold level indicated by the dot-dash line.

The total electrical energy supplied by the laser driver is proportional to the area beneath the solid curve in FIG. 2C, which does not include the shaded areas 203. The energy consumed by prior-art laser power modulation schemes does include these shaded areas, because the prior-art schemes maintain the resonant cavity in a continually excited state, just below the lasing threshold. The laser power modulation of the present invention is somewhat more involved in terms of timing than the prior art, but it is far more energy efficient. This is of considerable importance for battery-operated near-eye displays.

Figure 3B:
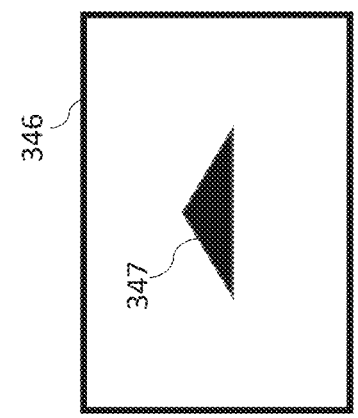
FIGS. 3A, 3B, 3C, and 3D: Drawings illustrating the timing of the laser power modulation when scanning an exemplary image field, according to the invention.
Figure 3D:
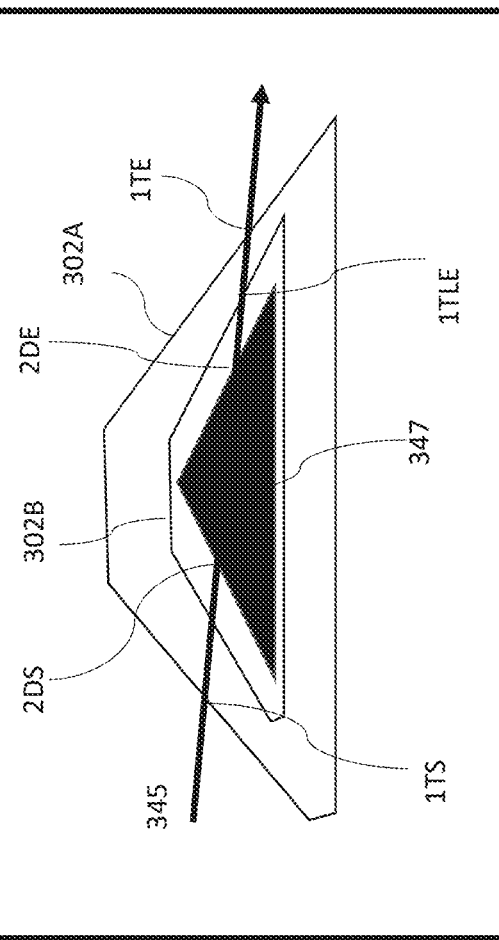
Figure 3A:
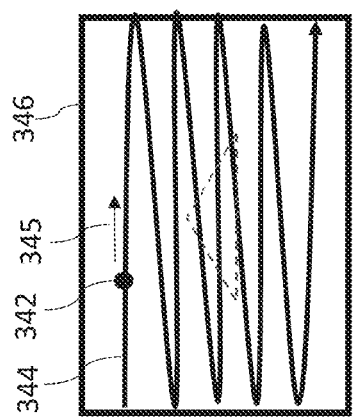

FIGS. 3A, 3B, 3C, and 3D show drawings illustrating the timing of the laser power modulation when scanning an exemplary image field, according to the invention. In FIG. 3A, image field 346 is scanned by a laser spot 342, whose motion is controlled by the scan driver 112. The spot moves in the direction of the arrow 345, forming a scan pattern that covers the entire image field 346.

FIG. 3B shows the scanning of an exemplary image pattern 347, represented by a black triangle, inside the image field 346. The laser driver 108 raises laser power above the lasing threshold level during the time that the laser beam scans over the interior of the image pattern 347. In prior-art laser power modulation schemes, the laser driver 108 maintains a threshold level of laser power while the laser spot scans over the white area of image field 346 as well, resulting in a waste of electrical power and possibly excessive heating of the laser module as well.

Figure 3C:
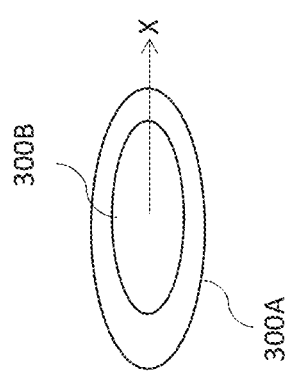

FIG. 3C shows uncertainly ellipses 300 A and 300 B for determining the timing of the laser power modulation, according to the invention. The ellipses represent the uncertainty of the laser spot position at the threshold time 1TS and the laser start time 2DS, respectively, as the spot scans line 344 in the image field 346. The ellipses are elongated in the X-direction, which approximately coincides with the scan direction of the resonant scanner 124. The scanning motion in this direction is very rapid, as compared with the scanning motion of the linear scanner 125. The dimensions of the ellipses also account for the rise time, (1TL-1TS), and the decay time, (1TE-1TLE), of the laser power modulation.

FIG. 3D shows the timing of the laser power modulation of the invention when scanning the exemplary image pattern 347. Line 345 indicates a line scanned by the laser spot. Shapes 302A and 302B represent convolutions of the exemplary image pattern 347 with the uncertainty ellipses 300A and 300B, respectively. The position of the laser spot is indicated at the corresponding laser power modulation times—1TS, 2DS, 2DE, 1TLE, and 1TE. These modulation times minimize the expenditure of electrical energy by the near-eye display, while ensuring that the laser module illuminates the image pattern 347 in coordination with the scanning.

Scanning Methods with Enhanced Eye Safety

In a near-eye display, the luminance of the laser-generated image generally has roughly the same luminance as outdoor daytime luminance, which is typically about 5000 NITs, where one NIT is equal to a white light intensity of one candela per square meter.

The following discussion presents the effect on eye safety of a malfunction of the scan module 123, in each of the following three cases:

(a) Resonance scanner 124 and linear scanner 125 are inoperative;
(b) Only the linear scanner is inoperative; and
(c) Only the resonant scanner is inoperative.

In case (a), the laser spot stays fixed in position over a single image pixel, and the apparent optical intensity in that pixel rises to 5000 NITs×N, where N is the number of image pixels. For example, for N=800×600=480000, the intensity rises to $2.4 \times 10^9$ NITs. This is approximately 1.5 times greater than the luminance impinging on the retina when one stares directly at the sun. Such a high intensity is clearly hazardous to the eye of a viewer. At the very least, the viewer would respond by blinking, and eventually by removing the near-eye display altogether.

In case (b), the linear scanner 125 is inoperative, and the resonant scanner 124 continues to operate normally. A calculation of the apparent optical intensity in this case is presented below, for the exemplary image field scan parameters given in Table 1. Note that the calculations presented are approximate and are simplified for the sake of illustration. For ensuring compliance with eye safety regulations, more involved computations are generally needed.

TABLE 1

Image Field Scan Parameters

| Parameter | Symbol | Approximate Value |
|---|---|---|
| Frame refresh rate | F | 60 Hertz |
| # lines per image | $N_L$ | 600 |
| # pixels per line | $N_P$ | 800 |
| Time per frame | $T_F = 1/F$ | 16 milliseconds |
| Time per line | $T_L = 1/(F * N_L)$ | 27 microseconds |
| Time per pixel | $T_P = T_L/N_P$ | 35 nanoseconds |
| Frequency of resonant scan mirror 24 | $f_M = F * N_L/2$ | 18 Kilohertz |

The frequency $f_M$ of the resonant scan mirror is calculated under the assumption of two-way illumination and no scan overhead. Resonant scanner 124 scans over a line in a time $T_L$ equal to 27 microseconds; however, because the line scanner 125 is inoperative, the same line is scanned many times in succession. The apparent intensity per pixel is equal to $2.4 \times 10^9$ NITs/$N_P$=$3 \times 10^6$ NITs. This apparent intensity is much less than the intensity of the sun and does not damage the eye, which dissipates thermal energy over a time of several microseconds, though it is still rather high and uncomfortable for the viewer.

In case (c), the resonant scanner 124 is inoperative, and the linear scanner 125 continues to operate normally. In this case the laser spot moves slowly from one line to the next, but dwells on the same horizontal location of each line for a relatively long time, equal to $T_F$, which is 16 milliseconds. Because the spot is moving so slowly, the apparent intensity impinging on the eye is nearly the same as in case (a), namely $2.4 \times 10^9$ NITs. Thus, the scanner malfunctions in cases (a) and (c) threaten the eye safety of the near-eye display viewer, and the malfunction in cases (b) may cause eye discomfort but not damage.

FIGS. 4A-4D, 5A-5D, and 6A-6D illustrate how various exemplary embodiments of the scanning method of the invention overcome the threat to eye safety posed by the abovementioned cases of scanner malfunctioning.

FIGS. 4A, 4B, 4C, and 4D show drawings illustrating a first three-spot scanning method according to an embodiment of the invention. In FIG. 4A, the three laser spots 480A, 481A, and 482A, on the image plane 410, correspond to the illumination from three different laser sources. The X and Y axes, indicated by arrows, represent the scanning axes of scanners 124 and 125, respectively. In FIG. 4A, the laser spots are arranged on a line substantially parallel to the X-axis. FIG. 4B shows the image fields 480B, 481B, and 481C formed by scanning of the laser spots 480A, 481A, and 482A, respectively. Note that the three image fields are shifted horizontally with respect to each other. The scan patterns for the three spots are indicated in FIG. 4B by a dashed line, a solid line, and a dotted line. The advantage of three laser spots, as compared with the combined spot of the prior art, is that the optical intensity is distributed, so that each spot has approximately ⅓ of the total intensity. Therefore, if the scanners 124 and 125 are both inoperative, as in case (a) above, the intensity per spot is only about ⅓ of that of the combined spot, namely (⅓) $(2.4 \times 10^9)$=$8 \times 10^8$ NITs.

FIG. 4C is a drawing showing the motion of the three spots 480A, 481A, and 482A, when only the linear scanner 125 is inoperative, as in case (b) above. In this case, the three spots scan over the same line 496 many times in succession. Insofar as the scan patterns nearly overlap, the same section of the viewer's eye is illuminated over a short time interval. For example, in a period of time of several microseconds, comparable to the thermal integration time of the eye, the three spots scan over three overlapping line segments 480C, 481C, and 482C. Because of the overlap, the apparent optical intensity for the viewer is approximately that of all three spots combined, namely $2.4 \times 10^9$ NITs/$N_P$=$3 \times 10^6$ NITs.

FIG. 4D is a drawing showing the motion of the three spots 480A, 481A, and 482A, when only the resonant scanner 124 is inoperative, as in case (c) above. In this case, the three spots 480A, 481A, and 482A scan over the three separate (non-overlapping) lines 480D, 481D, and 482D, respectively. Therefore, the apparent optical intensity in this case is only about ⅓ of that of the combined spot, namely (⅓) $(2.4 \times 10^9)$=$8 \times 10^8$ NITs.

Thus, in all three cases of scanner malfunctioning, the apparent optical intensity at the eye of the viewer is within eye-safety limits, for the three-spot scanning method illustrated in FIGS. 4A-4D.

FIGS. 5A, 5B, 5C, and 5D show drawings illustrating a second three-spot scanning method, according to another embodiment of the invention. FIG. 5A shows the position of the three laser spots 590A, 591A, and 592A, corresponding to the three different laser sources, as they appear on an image plane 510. The X and Y axes, indicated by arrows, represent the scanning axes of scanners 124 and 125, respectively. In FIG. 5A, the laser spots are arranged on a line forming an oblique angle with the X-axis. FIG. 5B shows the image fields 590B, 591B, and 591C formed by scanning of the laser spots 590A, 591A, and 592A, respectively. Note that the three image fields are shifted both horizontally and vertically with respect to each another. The scan patterns for the three spots are indicated in FIG. 5B by a dashed line, a solid line, and a dotted line. Furthermore, because the scan patterns are completely non-overlapping, the apparent optical intensity is reduced by a factor of about ⅓ in every pixel during normal operation, as compared with the combined spot of the prior art. Furthermore, if the scanners 124 and 125 are both inoperative, as in case (a) above, the intensity per spot is only about ⅓ of that of the combined spot, namely (⅓) (2.4×10$^9$)=8×10$^8$ NITs.

FIGS. 5C and 5D illustrate the motion of the three spots 590A, 591A, and 592A, when one of the two scanners is inoperative, because of a malfunction. In FIG. 5C, resonant scanner 524 is working and linear scanner 525 is inoperative, as in case (b) above. In this case, the three spots scan over the separate (non-overlapping) lines 590C, 591C, and 592C, and the apparent optical intensity for the viewer is only ⅓ of that of the combined spot in FIG. 4C, namely (⅓)(3×10$^6$)=1×10$^6$ NITs. In FIG. 5D, scanner 25 is working and resonant scanner 24 is inoperative, as in case (c) above. In this case, the three spots 580A, 581A, and 582A scan over the three separate (non-overlapping) lines 590D, 591D, and 592D, respectively. Therefore, the apparent optical intensity in this case is about ⅓ of that of the combined spot, namely (⅓)(2.4×10$^9$)=8×10$^8$NITs.

Thus, in all three cases of scanner malfunctioning, the apparent optical intensity at the eye of the viewer is within eye-safety limits, for the three-spot scanning method illustrated in FIGS. 5A-5D.

Figure 6A:
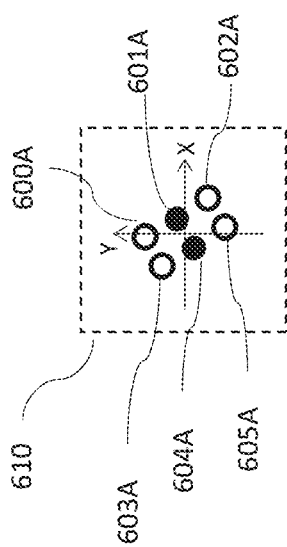
FIGS. 6A, 6B, and 6C: Drawings illustrating an exemplary six-spot scanning method, according to an embodiment of the invention.
Figure 6B:
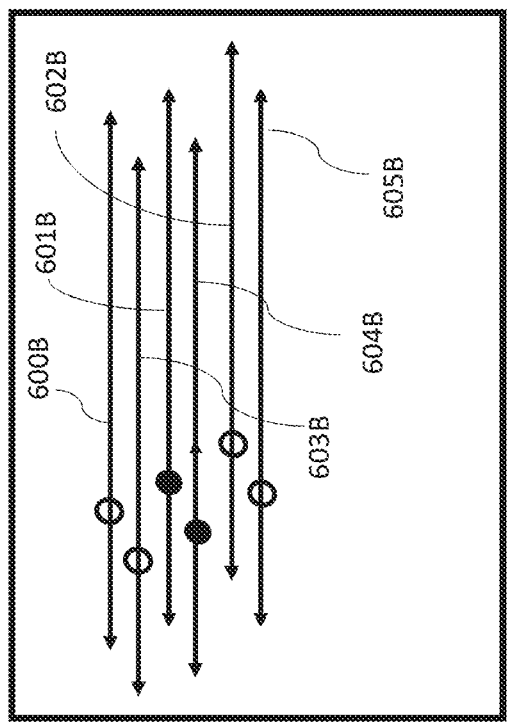
Figure 6C:
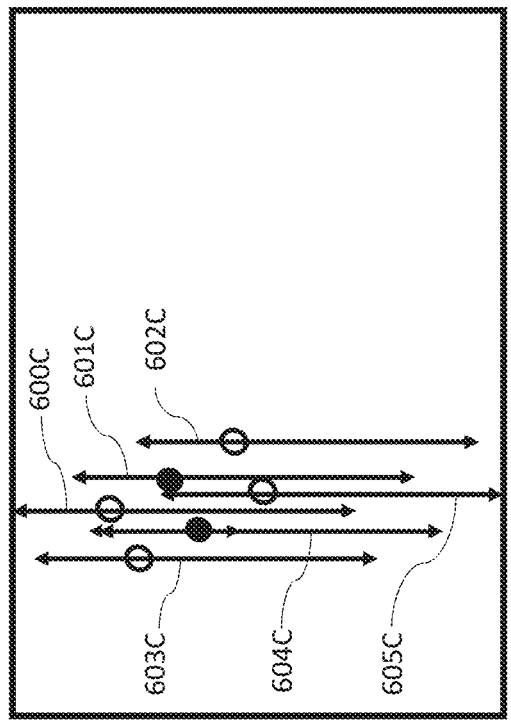

FIGS. 6A, 6B, and 6C show drawings of a six-spot scanning method, according to another embodiment of the invention. FIG. 6A shows the orientation of the six laser spots 600A through 605A, corresponding to six different laser sources, on an image plane 610. As before, the X and Y axes, indicated by arrows, represent the scanning axes of scanners 124 and 125, respectively. In FIG. 6A, the six laser spots are arranged on two lines forming an oblique angle with the X-axis. The image fields scanned by the six laser spots are shifted both horizontally and vertically with respect to each another. Furthermore, because the scan patterns are completely non-overlapping, the apparent optical intensity is reduced by a factor of about ⅙ in every pixel during normal operation, as compared with the combined spot of the prior art. Furthermore, if the scanners 124 and 125 are both inoperative, as in case (a) above, the intensity per spot is only about ⅙ of that of the combined spot, namely (⅙) (2.4 ×10$^9$)=4×10$^8$ NITs.

FIGS. 6B and 6CD illustrate the motion of the six spots 600A-605A when one of the two scanners is inoperative, because of a malfunction. In FIG. 6B, resonant scanner 124 is working and linear scanner 125 is inoperative, as in case (b) above. In this case, the six spots scan over the separate (non-overlapping) lines 600B-605B, and the apparent optical intensity for the viewer is only ⅙ of that of the combined spot in FIG. 4C, namely (⅙)(3×10$^6$)=×10$^5$ NITs. In FIG. 6C, linear scanner 125 is working and resonant scanner 124 is inoperative, as in case (c) above. In this case, the six spots scan over the six separate (non-overlapping) lines 600C-605C, and the apparent optical intensity for the viewer is about ⅙ of that of the combined spot, namely (⅙)(2.4×10$^9$) =4×10$^8$ NITs.

Thus, in all three cases of scanner malfunctioning, the apparent optical intensity at the eye of the viewer is within eye-safety limits, for the six-spot scanning method illustrated in FIGS. 6A-6C.

Controller Block Diagram

Figure 7:
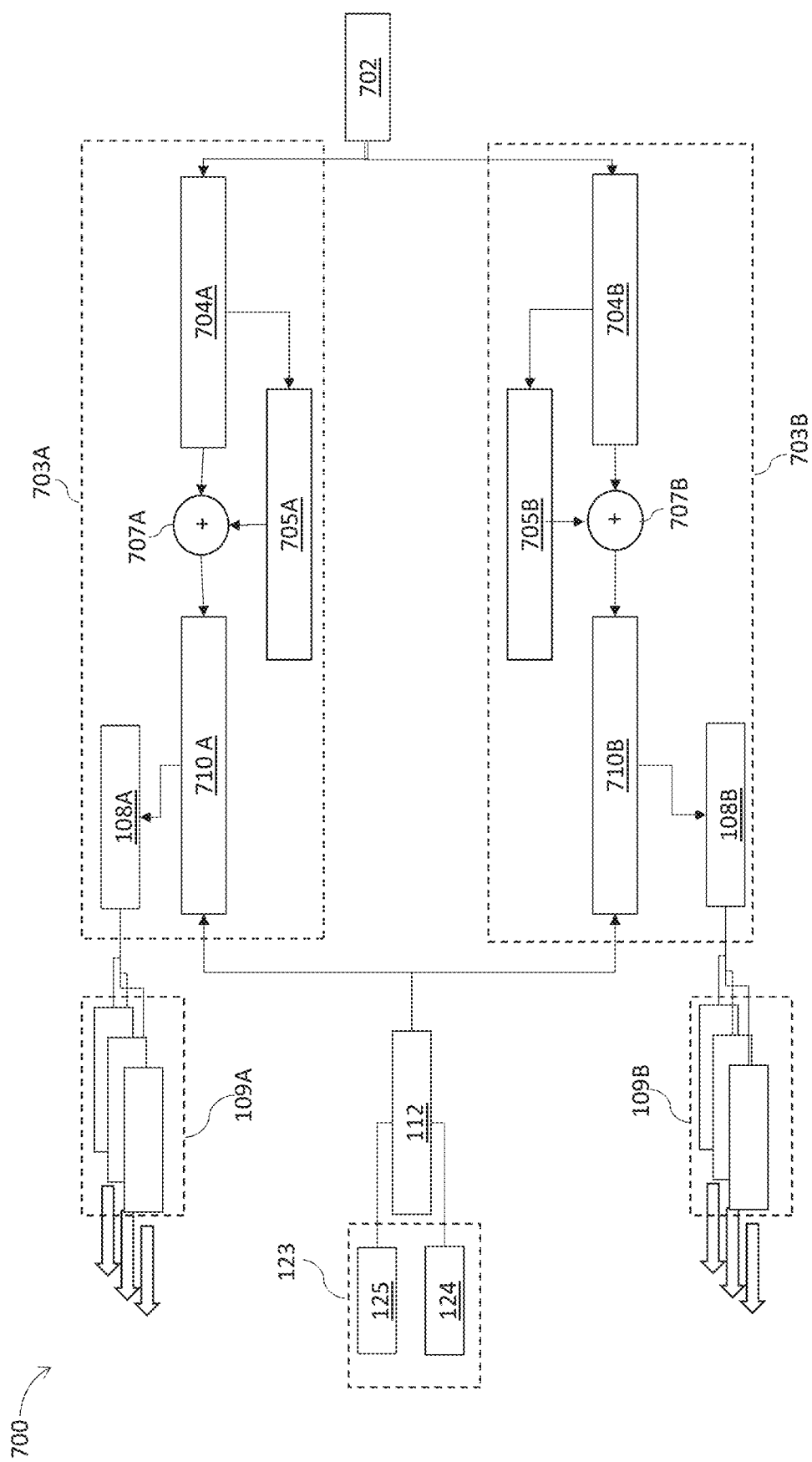
FIG. 7: An exemplary block diagram of a controller for a near-eye laser display, using the laser power modulation and the six-spot scanning method of the invention.

FIG. 7 shows an exemplary block diagram of a controller 700 for a near-eye laser display, using the laser power modulation and the six-spot scanning method of the invention. An image generator 702 provides image data to two three-laser illumination controllers, 203A and 203B, which produce two color images that are overlaid and projected to a viewer. There is essentially no correlation between the locations of the three laser spots controlled by illumination controller 203A, and those controlled by the illumination controller 203B; thus, each of the six laser spots generally illuminates a different pixel in the scanned image. Sometimes the spots overlap, resulting in an increase in intensity, and sometimes they do not overlap, resulting in an increase in resolution. Statistically, the use of two overlaid images leads to an increase in pixel throughput of the scanned image by a factor approximately equal to the square-root of two.

Each of the two illumination controllers 703A (or B) consists of a preprocessing unit 704A (or B), which corrects the image for optical distortions and color/white balance; a convolution unit 705A (or B) which convolves the uncertainty ellipses shown in FIG. 3C with the image pattern received from image generator 702; a summation (or superposition) unit 707A (or B); a coordination unit 710A (or B) which receives input signals from the scan driver 112 and provides interpolation and triggering signals to a laser driver 108A (or B), which controls the intensities of the three lasers in the laser module 109A (or B).

Scan module 123 includes the linear scanner 125 and the resonant scanner 124, which are also shown schematically in FIG. 1. The instantaneous position of the resonant scanner is measured by a sensor (not shown) and sent to the coordination modules 710A and 710B, which are in communication with the respective laser drivers 108A and 108B.

The presentation of separate units in FIG. 7 is for the purpose of clarity; in a specific implementation, it may be desirable to integrate the functions of separate units into a single module. Furthermore, the block diagram in FIG. 7 may be expanded to include more than the two illumination controllers 703A and 703B and to generate more than six laser spots in an image field. This would enable further improvements in eye safety, by further reducing the apparent optical intensity at the viewer's eye, and would enable an additional increase in pixel throughput as well.

It will be appreciated that the above descriptions are intended only to serve as examples, and that many other embodiments are possible and are included within the scope of the present invention described above and defined in the appended claims.

The invention claimed is:

1. A near-eye display for displaying an image to a viewer, the display comprising:
   a laser driver controlling a laser module;
   the laser module generating at least three laser spots; and
   a scan driver in communication with a scan module which moves the laser spots within an image field;
   wherein the laser driver provides a power modulation characterized by a baseline power level, a near-threshold power level, and a lasing power level; and
   wherein a timing of the power modulation is synchronized with the scan driver and is determined by a convolution of an image pattern with one or more uncertainty ellipses characterizing a position uncertainty of the laser spots.

2. The display of claim 1 wherein the timing of the power modulation is configured to minimize an electrical energy consumption of the near-eye display.

3. The display of claim 1 further comprising a controller comprising an image generator and at least two illumination controllers.

4. The display of claim 3 wherein the at least two illumination controllers are configured to synchronize the timing of the power modulation with the scan driver and the image generator.

\* \* \* \* \*